United States Patent [19]

Nicholson et al.

[11] Patent Number: 5,187,993
[45] Date of Patent: Feb. 23, 1993

[54] ACTUATOR FOR REMOTE CONTROL

[75] Inventors: John P. Nicholson, Shoreview;
Timothy J. Nicholson, Roseville,
both of Minn.

[73] Assignee: ADDCO Manufacturing, Inc., St.
Paul, Minn.

[21] Appl. No.: 743,682

[22] Filed: Aug. 12, 1991

[51] Int. Cl.⁵ .............................................. F16H 25/20
[52] U.S. Cl. ........................ 74/89.15; 74/424.8 VA;
185/40 R; 251/69
[58] Field of Search ................ 74/424.8 R, 424.8 VA,
74/89.15; 185/40 R; 251/69, 71

[56] References Cited
U.S. PATENT DOCUMENTS

| | | | |
|---|---|---|---|
| 3,640,140 | 2/1972 | Gulick et al. | 74/89.15 |
| 4,114,465 | 9/1978 | Troy | 185/40 R X |
| 4,635,491 | 1/1987 | Yamano et al. | 74/89.15 |
| 4,858,481 | 8/1989 | Abraham | 74/89.15 |
| 4,997,069 | 3/1991 | Strache | 251/69 X |

Primary Examiner—Allan D. Herrmann
Attorney, Agent, or Firm—Palmatier, Sjoquist & Helget

[57] ABSTRACT

A power operated linear actuator for remote operation of a machine. A cylinder frame containing a motor and a step-down gear train, a push-pull rod connected with a threaded nut movable along a high-pitch screw threaded shaft in the cylinder frame and an electromagnet clutch between the gear train and the screw shaft.

7 Claims, 3 Drawing Sheets

ACTUATOR FOR REMOTE CONTROL

This invention relates to an improved linear actuator for operating a machine control.

BACKGROUND OF THE INVENTION

Many types of machines have a control in the form of a mechanical device, such as a lever, to operate the machine between a stopped condition, perhaps an idle condition, to a fully engaged position wherein the machine is operating at maximum capacity and oftentimes the control or lever will have intermediate settings or positions between its stopped or rest position and its position of maximum movement so as to operate the machine at an intermediate level of operation. One example of such a machine is a trencher which moves along the ground and progressively produces a trench in the ground for the purpose of laying a pipe or wire, or some other similar type of facility. The trencher has a control which regulates the travel of the machine along the ground; and the trencher also has another control which regulates the trench digging facility of the machine. It may be desirable to operate these controls for the trencher from a position remote from the actual levers or physical controls which open the valves or operate electrical devices.

Another such example is a concrete mixing truck where it is desirable to be able to control the discharge of the flowing concrete being carried by the truck from a position within the cab of the truck. In this instance, it may be desirable to operate a hydrostatic pump from a position remote from the pump, in order to cause the concrete mixing to either discharge the concrete or discontinue the discharging of concrete. Of course, operating the valve may be by a push-pull device or by a swingable or tiltable lever.

Linear actuators for performing such control functions have been known previously, and have utilized an electric motor, the speed of which is geared down to turn a low pitch screw to operate a nut and cause travel of the nut which is connected to a push-pull rod for operating a cable to control the machine. Such linear actuators have been successful in many respects, but have had certain significant problems.

Where such previously known linear actuators have been used, oftentimes they are used in situations such as construction sites where many facilities are being simultaneously used and the machines and the controls are subject to damage. If the electrical power being supplied to such a previously known linear actuator is suddenly terminated, the electric motor will suddenly stop, or if the nut and push-pull rod has already been moved and extended, the push-pull rod or the cable will simply stay in its extended position and of course, the machine being controlled will continue to operate at the conditions to which it has been previously set. If the machine is a trencher, it may be that the trencher will continue to travel along the ground, out of control, or the trenching device may continue to dig deeper and deeper, depending upon which controls are being regulated.

In the case of a cement truck, if the power to the actuator motor is suddenly terminated, it may be that the concrete mixing truck will continue to discharge excessive amounts of concrete where only a small amount of concrete is desired.

SUMMARY OF THE INVENTION

An object of the invention is to provide an improved power operated linear actuator of simple construction for remotely operating the controls of a machine.

Another object of the invention is to provide an improved power operated linear actuator which will effectively release from the machine being controlled in the event of a loss of electrical power, for the safe operation of the actuator and machine.

A feature of the invention is a linear actuator utilizing a releasable drive clutch between the electric motor and the screw which causes travel of the nut and carriage to which the extendable and retractable push-pull rod is attached. The clutch is controlled by an electromagnet which engages the clutch for transmission of motion when the clutch is energized; and the clutch releases when power is removed from the coil of the electromagnet. The coil is powered from the same source as the electric motor, but is separately controlled as to engage the clutch whenever the motor is operated, whether the motor turns forwardly or rearwardly.

Another feature of the invention is the use of a high-pitch helical screw for driving the nut, carriage and push rod as the screw rotates. This high-pitch helical screw, together with the similar high-pitch thread of the nut, establishes a reversible driving connection between the motor and the push-pull rod. Accordingly, the high pitch of the screw allows, when the clutch is released, the screw to turn and allow linear movement of the push rod, nut and carriage. The actuator thereby allows the push rod, and the machine control operated thereby, to return to a start or centered position, under the influence of a return spring or the like, when the clutch is released for unintended lack of power. The returned machine control will thereby return the machine to a stopped or idling condition.

A primary advantage of the improved actuator is that in the unlikely event of a power failure, i.e., an accidentally cut or broken wire for the actuator, the clutch is released as the motor is stopped so that the push rod is released and the machine control which was being operated by the actuator is released and may move or return to its start or centered position. Thereby, the machine being controlled will not run away without control.

DETAILED SPECIFICATION

Figure 1:
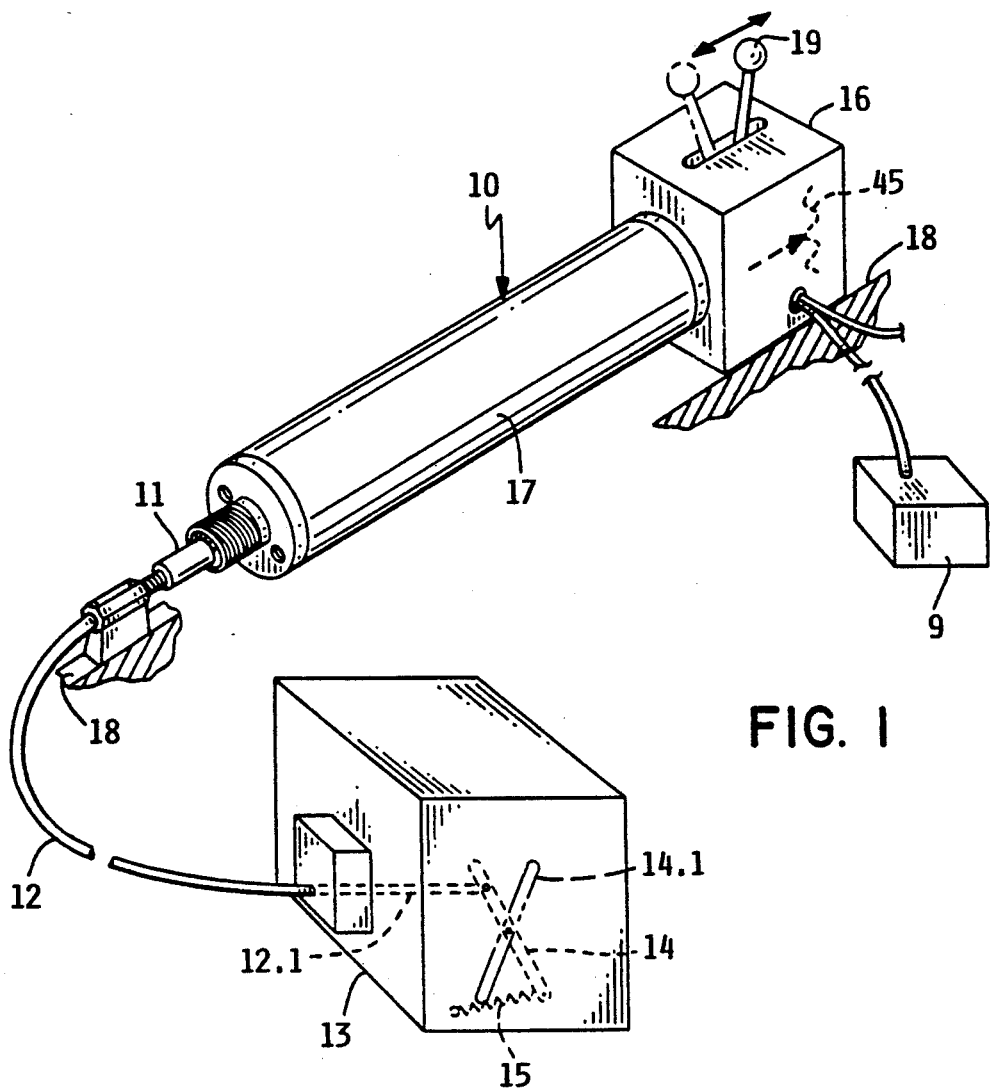
FIG. 1 is a perspective view of the linear actuator attached to a remote machine control which is illustrated schematically.

One form of the linear actuator is illustrated in the drawings and is described herein. A source of electrical power is indicated by the numeral 9 and supplies the linear actuator which is indicated in general by numeral 10. The actuator 10 has an extendible and retractable push-pull rod 11 connected by a long cable 12 to a remote control 13 wherein the cable is connected to an operating lever 14 or similar device which directly controls a form of machine or apparatus that is to be ultimately controlled. The control lever 14 in most cases will have a return spring 15 to return it to its neutral position indicated by the numeral 14.1 so as to put the machine being controlled into a neutral or non-operating position.

In the form shown in FIG. 1, the manual operating control 16 for the linear actuator is fastened and mounted directly to the frame cylinder 17 of the linear actuator and is anchored on a stationary mounting 18 to allow the control handle or joy stick 19 to be shifted forth and back into opposite positions as illustrated in FIG. 1. Of course, the cable sheath is mounted on a portion of the stationary mounting 18 so that as the extendible and retractable push-pull rod 11 is moved, the center rod or wire 12.1 of the control cable 12 will be moved through the outer sheath as to move the lever 14.

Figure 2:
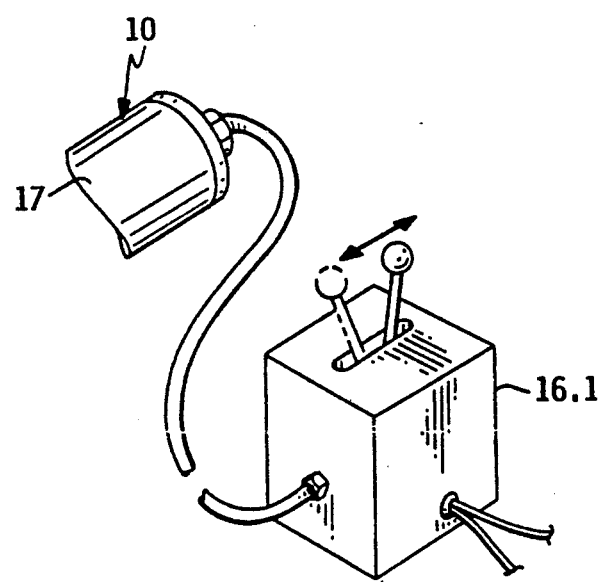
FIG. 2 is a perspective view showing a slight modification of the actuator and its controls.

In FIG. 2, the control 16.1 is separated from the frame cylinder 17 of the linear actuator so that the control station 16.1 may be located remotely from the linear actuator 10.

Figure 3:
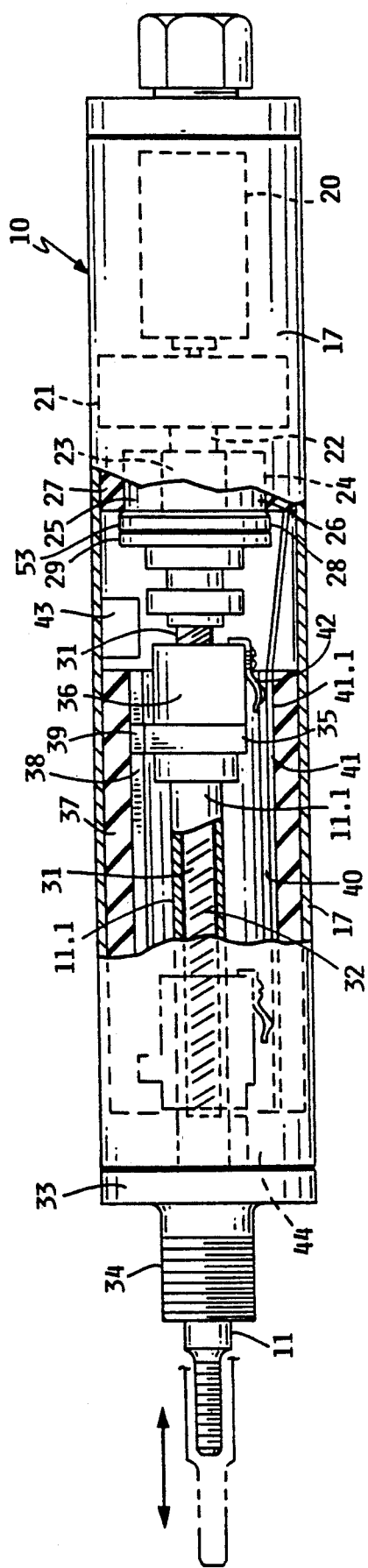
FIG. 3 is an elevation view, partly broken away and shown in section and illustrating the principal portions of the linear actuator.
Figure 5:
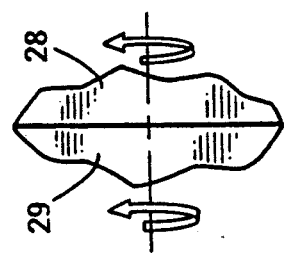
FIGS. 4 and 5 are greatly enlarged detail elevation views of the magnetic head and armature plate of the electromagnet in disengaged and engaged conditions, respectively.

The linear actuator 10 is shown in considerable detail in FIG. 3. The frame cylinder 17 is shown to be hollow and is illustrated in section at the central portion thereof. The linear actuator includes a reversible rotary drive motor 20 mounted to be stationary within the frame cylinder 17. The motor 20 may be, typically, a reversible 12 volt 13,900 RPM (no load) motor, producing 12,110 RPM at 2.40 ounce-inches torque, drawing 2.65 amperes. Motor 20 drives a speed reducing planetary gear train 21. The output shaft 22 from the gear train 21 is connected to the rotary, ferromagnetic core 23 of an electromagnet 24, the coil 25 of which is confined in the housing 26 of the electromagnet, and is secured by a mounting ring 27 within the frame cylinder 17 so that the housing 26 and the coil 25 are stationary within the frame cylinder 17.

Figure 4:
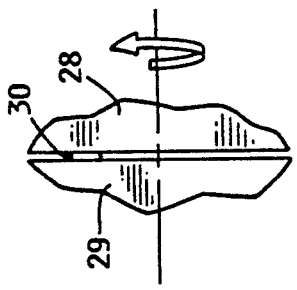

The electromagnet 24 has a magnetic head 28 which is connected directly to the core 23 and revolves therewith as the shaft 22 of the gear train revolves. The magnetic head 28 is a ferromagnetic plate with a substantially flat face which confronts and may bear against the face of an armature plate 29 which is also formed of ferromagnetic material to be drawn against the armature head 28 in a friction driving relationship when the coil 25 of the electromagnet 24 is energized as to transmit rotary motion from the core 23 and magnetic head 28 of the electromagnet. The armature 29 is spaced from the magnetic head 28 by springs 30 shown schematically in FIG. 4, so that the armature will move away from the magnetic head 28 and out of the frictional drive relationship therewith when the coil 25 of the electromagnet 24 is deenergized.

The armature 29 is mounted on the end of a shaft 31 extending substantially from the armature plate 29 to the end of the frame cylinder 17 adjacent end cap 33 through which the push-pull rod 11 extends. The rotary shaft 31 is formed with a high-pitch helical screw 32 formed therein. In a preferred form of the linear actuator 10, the screw 31 has a diameter of approximately 5/16ths of an inch and a lead of 0.500 inches. The screw 31 is confined within a tubular portion 11.1 of the push-pull rod 11 so that the push-pull rod may travel along the shaft 31, causing the end of the push-pull rod which protrudes from the boss portion 34 of end cap 33 to move forwardly and rearwardly, or inwardly and outwardly, of the frame cylinder 17 of the linear actuator.

The inner tubular portion 11.1 of the push-pull rod 11 is affixed to and driven by a movable carriage 35, which includes a threaded nut 36 which is engaged with the helical screw 32 of shaft 31, and the nut 36 and carriage 35 move along the shaft 31 as the shaft revolves. Of course, as the screw shaft 31 revolves, the carriage 35 and nut 36 travel along the shaft and the push-pull rod 11 extends from the end cap 33 or is retracted into and through the end cap 33. The length of travel of nut 35, carriage 36 and push-pull rod 11 is typically three to five inches.

The carriage 35 and nut 36 are guided in the frame cylinder 17 by a nut housing 37 which has a groove 38 in its upper portion. A sliding lug or key 39 affixed to the carriage 35 is guided in the groove or guideway 38 to prevent the carriage and nut from revolving with the shaft, and to maintain the carriage 35 and nut 36 in predetermined orientation within the frame cylinder 17.

A second groove 40 is formed in the bottom portion of the nut housing 37 and extends along the full length of the nut housing 37. A linear resistor 41 lies in and is affixed in the groove 40.

A wiper or electrical contact 42 is affixed on the nut 36 to travel along the frame cylinder with the carriage 35, and the wiper 42 engages the linear resistor 41 so that the resistor, together with the wiper 42, form a linear feedback potentiometer 41.1 useful in the operation of the actuator 10 as hereinafter described.

The actuator 10 also has a pair of limit switches 43 and 44 respectively affixed in the frame cylinder adjacent opposite ends of the length of travel of carriage 35 and nut 36; and each of the limit switches 43 and 44 has a feeler to be engaged by the carriage 35 and nut 36 at the limits of its travel so as to operate the switches 43, 44.

In the control 16 of FIG. 1, another command potentiometer 45 is operated by the joy stick 19 so that the wiper on the potentiometer 45 changes its position.

Figure 6:
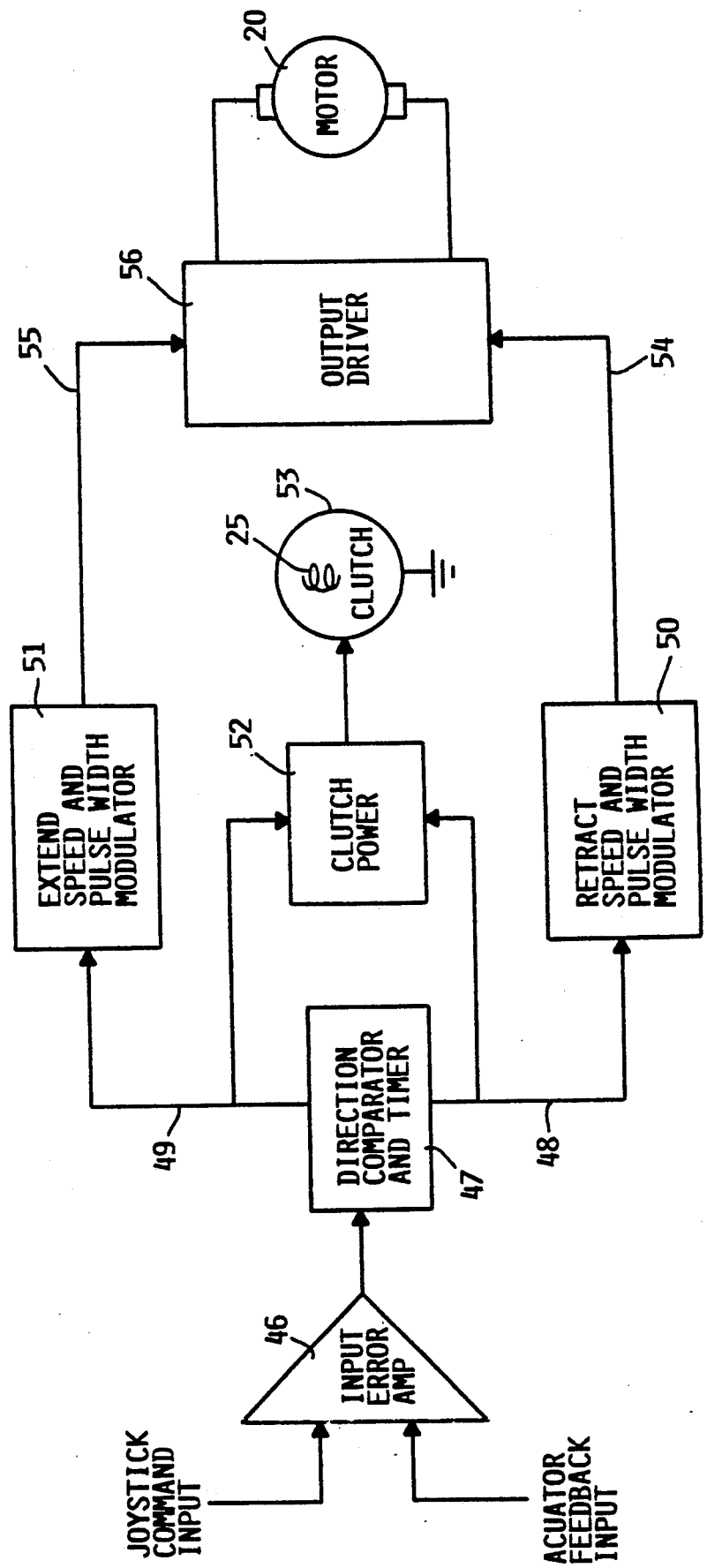
FIG. 6 is a schematic block diagram illustrating the principal functional parts of the control system for the linear actuator.

As the joy stick 19 is moved, the potentiometer 45 varies the input supplied to an input error amplifier 46 illustrated in FIG. 6. Similarly, the potentiometer 41.1 also provides the actuator feedback input to the input error amplifier 46.

The error input amplifier 46 accepts voltage inputs from both the command potentiometer 45 operated by the joy stick 19; and also from the feedback potentiometer 41.1 provided by resistor 41 and wiper 42 which indicates the location of the carriage 35 and push-pull rod 11. When the inputs from the two command and feedback potentiometers are in balance, the input error amplifier will have no output and accordingly, the motor 20 will remain stationary. When the inputs from the command and feedback potentiometers are different from each other, the error is sensed by the input error amplifier 46, and the amplifier 46 sends a signal to a direction comparator and timer 47 to incrementally operate the motor 20 in the appropriate direction until the inputs are again in balance, at which time the motor will stop. Of course, trimmers may be provided for the input error amplifier to control the rate of actuator travel.

The direction comparator 47 receives the error signal from the input error amplifier 46 and determines the direction in which the actuator must be driven in order to correct the error signal received. Accordingly, the direction comparator has two outputs at 48 and 49 which are respectively connected to a retract speed and pulse width modulator 50 and an extend speed and pulse width modulator 51. The outputs 48, 49 of the direction comparator and timer 47 are also connected to a clutch power circuit 52 which is connected to the clutch 53 of the actuator and specifically includes the electromagnet coils 25 as illustrated.

Accordingly, it will be seen that whenever an error signal is received from the input error amplifier 46, causing an output signal to be transmitted through one of the outputs 48, 49 of the direction comparator 47, so as to indicate the direction in which the actuator must be driven in order to correct the error signal, the clutch will also be energized as to cause turning of the shaft 31 and screw 32 when the motor 20 is operated. The speed and pulse width modulators 50 and 51 are alternately operated according to the signal generated by the direction comparator 47. The speed and pulse width modulators 50, 51 generate drive signals, and the pulse width is varied according to the speed at which the motor is to be driven. When the drive signals from either the speed and pulse width modulators 50, 51 have substantial width, the motor will be driven at a higher rate of speed than when the pulse width is narrow. The speed and pulse width modulators 50, 51 have output connections 54, 55 and are connected with the output driver which receives the drive signals from the speed and pulse width modulators and turns on the motor 20, causing the motor to turn in the appropriate direction to either extend or retract the linear actuator and specifically the push-pull rod 11 thereof.

The timer portion of the direction comparator and timer 47 measures the length of time during which an error signal is received from the output error amplifier 46; and when the input error signal from the amplifier 46 is not corrected within a predetermined time period, such as three seconds, the direction comparator and timer 47 will cause the clutch circuit 52 to disengage the clutch 53. The failure to correct the error signal from the input error amplifier 46 may be caused by a broken wire, a stalled motor, or faulty input signals, and the clutch is disengaged as a fail-safe feature.

It is important to recognize that the control system illustrated in FIG. 6, including the motor 20 and the clutch 53, all derive their power from the power supply 9. When the power supply 9 fails for some reason, such as a ruptured wire or a damaged piece of equipment, no power is then supplied to either the clutch 53 or to the motor 20. In the event that the power is removed from the clutch 53, the electromagnet coil 25 is deenergized, and the magnetic head 28 of the electromagnet 24 no longer retains the armature plate 29 in friction driving relation and the armature plate 29 will separate from the head 28 so as to be free to revolve with respect to the magnetic head.

Accordingly, the carriage 35 and nut 36, and the push-pull rod 11, are now free of the motor 20 and gear train 21. The return spring 15 will urge the control lever 14 to its home position indicated at 14.1 and the cable 12 will urge the push-pull rod 11 to whatever position may be required to allow the control lever to return to its home position. The push-pull rod 11 will move the nut 36 along the screw 32 and because the screw has a high pitch as indicated, the movement of the nut along the shaft 31 will tend to cause the shaft to rotate freely without being held by the electromagnet or by the gear train 21 or the motor 20. The push-pull rod will be positioned according to the movement dictated by spring 15 and operating lever 14 in the controlled machine. As a result, the controlled machine is allowed to move into a neutral condition, either slowing the engine to an idle condition or stopping the movement of whatever mechanism is being controlled.

It will be seen that the improved linear actuator 10 incorporates a clutch between the motor 20 and the push-pull rod 11, thereby allowing the push-pull rod 11 to return to a home position under control of the operated machine when the clutch is deenergized, releasing the high-pitch screw to turn under influence of the endways motion of the push-pull rod 11 and the nut 36 and carriage 35. Such a loss of power controlling the linear actuator is infrequent, but without the clutch provided in the actuator between the motor and screw, and without the high-pitch of the screw 32, the machine being operated may otherwise continue to operate as it had before an accidental disengagement of the power supply occurred.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

I claim:

1. A linear actuator for remote operation of a machine control, comprising an elongate frame portion and a reciprocally traveling carriage portion thereon to move forth and back along the elongate frame portion, the carriage portion comprising a threaded nut portion movable forth and back with the carriage portion, a push-pull rod portion attached to the carriage portion for movement therewith and for connection to such a machine control for forth and back movement, and a releasable drive portion on the frame to produce said forth and back movement of the carriage portion, and said drive portion comprising an elongate rotary screw portion driving the carriage portion, the threaded nut portion and the screw portion defining a reversible driving connection whereby to accommodate driving the carriage portion in forth and back directions as the screw portion is rotated in opposite directions, and to also accommodate moving of the carriage in forth and back directions under influence of the machine control when the screw portion is released to freely turn, an incrementally movable and reversible motor portion and control means therefor, the reversible motor portion rotating the screw portion and producing travel of the carriage portion alternately in opposite forth and back directions as the motor is reversed, and an electromagnetically engageable and releasable clutch portion connected between the motor portion and the screw portion, the clutch portion being engageable to cause the screw portion to rotate in either direction and to stop and to thereby move the carriage portion and machine control forth and back as the motor portion and screw portion are reversed and also to thereby stop the carriage portion and machine control as the motor is stopped, and the clutch portion being releasable when electrical power is removed from the clutch portion as to release the screw portion to turn freely and thereby allow the carriage portion to freely move in either or both forth and back directions under influence of the machine control and thereby allow the machine control to operate independently of the motor portion.

2. A linear actuator according to claim 1 wherein said control means supplies electrical power to both the electromagnet portion and the motor portion.

3. A linear actuator according to claim 1 wherein said drive portion also comprises a speed reducing gearing portion between the motor portion and the clutch portion.

4. A linear actuator according to claim 1 wherein said control means comprises a linear feedback potentiometer comprising a linear resistor on the frame and a wiper on the nut and moving along the resistor to produce an input signal to indicate the position of the nut.

5. A linear actuator according to claim 4 wherein said control means also comprises a command potentiometer producing an input signal to be compared to and balanced against the input signal from the feedback potentiometer to cause controlled rotation and stopping of the motor.

6. A linear actuator according to claim 1 wherein said clutch portion comprises plate portions engageable and disengageable with each other in friction driving relationship.

7. A linear potentiometer according to claim 6 wherein said plate portions have face portions releasably bearing against each other.

* * * * *

UNITED STATES PATENT AND TRADEMARK OFFICE
CERTIFICATE OF CORRECTION

PATENT NO. : 5,187,993

DATED : February 23, 1993

INVENTOR(S) : John P. Nicholson, et al.

It is certified that error appears in the above-indentified patent and that said Letters Patent is hereby corrected as shown below:

On the title page [75] listing of inventors, please add:
--Eugene H. Luoma, Duluth, Minnesota--.

Signed and Sealed this

Twenty-third Day of November, 1993

*Attest:*

BRUCE LEHMAN

*Attesting Officer*     *Commissioner of Patents and Trademarks*